United States Patent
Shirato

(10) Patent No.: US 7,199,642 B2
(45) Date of Patent: Apr. 3, 2007

(54) BATTERY-POWER-OPERATED CIRCUIT

(75) Inventor: Keiji Shirato, Kanagawa (JP)

(73) Assignee: Sony Corporation, Tokyo (JP)

( * ) Notice: Subject to any disclaimer, the term of this patent is extended or adjusted under 35 U.S.C. 154(b) by 683 days.

(21) Appl. No.: 10/625,794

(22) Filed: Jul. 23, 2003

(65) Prior Publication Data
US 2004/0124716 A1 Jul. 1, 2004

(30) Foreign Application Priority Data
Jul. 25, 2002 (JP) .................... P2002-216792

(51) Int. Cl.
G11C 5/14 (2006.01)
(52) U.S. Cl. ..................... 327/530; 327/110
(58) Field of Classification Search ............. 327/110, 327/530
See application file for complete search history.

(56) References Cited

U.S. PATENT DOCUMENTS 5,789,951 A * 8/1998 Shen et al. ............. 327/110
6,046,896 A * 4/2000 Saeki et al. ............. 361/86
6,373,325 B1 * 4/2002 Kuriyama ............... 327/536
6,429,701 B2 * 8/2002 Karaki et al. ............ 327/110
2002/0048193 A1 * 4/2002 Tanikawa et al. ....... 365/185.33

FOREIGN PATENT DOCUMENTS

JP 61 263175 11/1986
JP 8 23578 1/1996

* cited by examiner

Primary Examiner—Quan Tra
(74) Attorney, Agent, or Firm—Frommer Lawrence & Haug LLP; William S. Frommer; Thomas F. Presson

(57) ABSTRACT

A source-voltage-operated circuit having: an electric power source; an operated circuit section operated according to a voltage supplied by the electric power source; a control-voltage-supplying circuit section for deriving a voltage higher than the voltage supplied by the electric power source from the operated circuit section to rectify the derived voltage and output the resultant voltage as an operating voltage; and a control circuit section operated according to the operating voltage for controlling the operation of the operated circuit section and stopping the operation of the operated circuit section when the operating voltage is decreased to a given reset voltage or below.

5 Claims, 14 Drawing Sheets

BATTERY-POWER-OPERATED CIRCUIT

BACKGROUND OF THE INVENTION

1. Field of the Invention

The present invention relates to an arrangement of a circuit operating according to an electric power source in which the power supply fluctuates. More specifically, it relates to a battery-power-operated circuit, for example, suitable for an infrared (IR) remote commander operating according to primary and secondary batteries, etc.

2. Description of the Related Art

For example, in devices including an IR remote commander, circuits for operation control are formed from ICs.

Digital circuits such as ICs usually incorporate a reset circuit for monitoring a supply voltage, and they are arranged to generate a reset voltage or to start or stop the operation thereof with a reset voltage supplied from the outside.

This is required in order to prevent the circuit from working at and below the lower limit of voltages at which the circuit can operate normally thereby to avoid unwanted malfunctions. Hence, the digital circuit is made inoperable at and below the voltage lower limit.

In a circuit according to an electric power source which supplies an unstable voltage, such as the case where an electric power source is a battery, i.e. a primary or secondary battery, the life voltage of the battery is set as a reset voltage.

Further, a battery has an internal resistance, the current consumption of which decreases a terminal voltage of the battery. Therefore, the larger the current is, the earlier the terminal voltage of the battery reaches a life voltage thereof.

FIG. 8 shows an example of conventional circuits in IR remote commanders.

In the exemplary circuit in FIG. 8, two batteries are used as electric power sources.

A battery voltage of 3 volts according to the battery BAT is stabilized by the capacitor C1 and used as an operating voltage of the IC 1. The battery voltage is also applied to a series circuit composed of the IR emitting diode (LED) D1 and the transistor Q1 through the resistor R1.

The IC 1 is contained as a control circuit, which carries out the control of causing the LED to output a given command signal in response to the operational input information detected by a key matrix 3.

In the remote commander, many operation keys, which allow users to operate the electronic equipment that they are to work, are prepared. The individual keys are so arranged that the operation can be detected with electrodes making up a matrix.

The IC 1 is configured as a digital circuit in which an oscillator 4 provides clocks for operation. The IC 1 generates a command signal (pulse voltage signal) in response to the operation detected by the key matrix 3 and applies the current in response to command signals (voltage pulse) to the base of the transistor Q1 through the resistor R2.

The transistor Q1 is turned ON or OFF based on the base current according to the command signal. In a period during which the transistor Q1 is turned ON, a current flows through the IR emitting diode D1, whereby infrared rays are output therefrom. Therefore, the output infrared rays form IR command signals in response to command signals generated by the IC 1.

The IC 1 incorporates a reset circuit 2. The reset circuit 2 monitors an operating voltage supplied to the power source terminal P, and stops the operation of the IC 1 when the operating voltage at the power source terminal P is equal to or lower than a reset voltage.

In the case of the circuit of FIG. 8, while the forward dropped voltage (Vf) of the LED D1 is about 1.5 volts, the battery voltage is 3 volts and as such, the current-limiting resistor R1 must be inserted in series with the LED D1.

The power consumed by the resistor R1 only changes into heat. Such power consumption is ineffective to cause the LED D1 to emit light and deteriorates the energy efficiency of the battery.

When the IC 1 has a usual operating voltage of 3 volts and a reset voltage of about 1.5 volts, the circuit of FIG. 8 is operable to the extent of a half of the battery voltage. Although this presents no problem in battery life, two batteries are required.

From this, various types of circuits which can operate with a battery and improve the energy efficiency have been proposed, but they have presented problems as described below.

FIG. 9 shows an example of a circuit, each using one battery as an electric power source. In the circuit examples to be described sequentially, the same parts as those in a circuit example already described before then are identified by the same reference character to avoid repeating the same descriptions.

In the case of the circuit of FIG. 9, a battery voltage of 1.5 volts according to the battery BAT is stabilized by the capacitor C1 and used as an operating voltage of the IC 1.

The transistor Q1 and the coil (inductor) L1 are connected in series with each other. The IR emitting diode D1 is connected in parallel with the coil L1. In this case, the anode terminal of the LED D1 is connected to the collector of the transistor Q1.

Since the LED D1 has a forward voltage drop of about 1.5 volts, the same circuit configuration as that in FIG. 8 cannot cause a sufficient current to be passed through the LED D1. Therefore, the circuit incorporating the coil L1 as shown in FIG. 9 is required.

In the case of this circuit, in a period during which the transistor Q1 is turned ON, a current flows in response to a command signal from the IC 1 in the order of: the positive electrode of the battery, coil L1, transistor Q1, and negative electrode of the battery.

Then, in a period during which the voltage of the command signal from the IC 1 becomes Low and the transistor Q1 is turned OFF, a current flowing through the coil L1 changes into a loop current flowing from the coil L1 through the LED D1 back to the coil L1. The loop current serves as a current to cause the LED D1 to emit light.

The circuit of FIG. 9 does not have a component corresponding to the current-limiting resistor R1 in FIG. 8, so that the efficiency of energy utilization of the battery is higher.

However, a voltage supplied by one battery, 1.5 volts, is to be used as a steady-state voltage in the IC 1, whereby the reset voltage of the IC 1 is limited to 0.9 to 1.0 volt for the reason of IC manufacturing. Accordingly, when the battery is drained to lower the operating voltage to about 1 volt, the reset circuit 2 stops the operation of the IC 1.

When a current flows through the LED D1, the internal resistance of the battery BAT further lowers the terminal voltage of the battery.

As the battery is drained to some extent, the voltage generated by the battery further decreases and the internal resistance increases. While the LED D1 is emitting light, the terminal voltage of the battery further decreases and thus becomes lower than the reset voltage easily. Even in the case where the terminal voltage of the battery in no-load conditions is sufficiently high, flowing a current lowers the buttery terminal voltage. Then, when the operating voltage decreases below the reset voltage, the operation of the IC 1 is stopped.

In the case of the circuit of FIG. 9 using one battery in this manner, the difference between the steady-state voltage and the reset voltage is small. On that account, battery drain hastens the occurrence of the event where the battery drain renders the IC inoperable. In addition, even when the battery voltage is somewhat higher than the reset voltage of the IC, a momentary voltage drop can actually render the IC inoperable. Therefore, at the point in time when the battery voltage has approached the reset voltage, the battery voltage reaches its operating limit, whereby the operable time provided by the battery is shortened.

Contrarily, FIG. 10 shows an example of circuits in which a momentary voltage drop is compensated to some extent.

In FIG. 10, the power source terminal P of the IC 1 is connected to the battery terminals through a time constant provided by the resistor R3 and the capacitor C2. This prevents the voltage at the electric power source terminal P of the IC 1 from lowering immediately upon a momentary drop in the terminal voltage of the battery.

On this account, the working voltage lower limit of the circuit of FIG. 10 is somewhat lower than the above-described circuit in FIG. 9. However, it is common to both the circuits in FIGS. 9 and 10 that the power source terminal voltage of the IC 1 lowers in operation.

The voltage coming from a charge accumulated by the capacitor C2 causes a reverse passing through the resistor R3 when the terminal voltage of the battery BAT lowers. However, this also decreases the voltage of the power source terminal of the IC 1.

FIG. 12 shows an example of a circuit produced by replacing the resistor R3 of the circuit of FIG. 10 with a diode D2. Use of the diode D2 can eliminates the reverse current described above.

However, the diode has a forward voltage drop, which always lowers the voltage at the power source terminal P of the IC 1 correspondingly. For example, even when a schottky-barrier diode is used as the diode D2, the amount of the voltage drop is too large to ignore in using the diode in a circuit with one battery because of its forward voltage drop of about 0.2 volt.

In addition, the voltage at the capacitor C2 cannot rise above the terminal voltage of the battery. Therefore, as the terminal voltage of the battery lowers, the voltage at the capacitor C2 decreases to that voltage gradually.

FIGS. 11A and 11B, and 13A and 13B present the results of observations for states of the voltages in the circuits of FIGS. 10 and 12, respectively.

FIGS. 11A and 13A show voltages obtained at each of the capacitors C2, i.e. voltages at the power source terminal P in the IC 1. FIGS. 11B and 13B show terminal voltages of the batteries BAT.

Incidentally, a used battery, which had been drained to some extent, was used as the battery BAT in the observations.

The current flowing through the LEDs D1 is as large as 200 to 400 mA. Therefore, the internal resistance of the battery BAT causes a voltage drop in its terminal voltage. As shown in FIGS. 11B and 13B, the minimum voltage of the battery terminal voltage in operating conditions lowers as low as about 1.0 volt in spite of the battery having a terminal voltage of about 1.4 volts in no-load conditions.

If the circuits were that shown in FIG. 9, the ICs 1 would become inoperable at this stage.

In the case of the circuit of FIG. 10, the voltage at the capacitor C2 is leveled. Therefore, the voltage at the capacitor C2 did not lower to the minimum voltage of the battery terminal and the minimum voltage thereof was 1.26 volts, as shown in FIG. 11A.

In the case of the circuit of FIG. 12, the voltage at the capacitor C2 lowers more slowly than that in the case of FIG. 10 because of no reverse current from the capacitor C2 to the battery terminal, while it also rises more slowly. When the number of times of repeated sending (IR emission) became larger, the voltage at the capacitor C2 decreased to about 1.18 volts, as shown in FIG. 13B.

In other words, in the case where the reset voltage was set to 1 volt, operating the IC with a used battery capable of supplying a voltage of 1.43 volts in no-load conditions, the voltages at the power source terminals P of the ICs 1 for the circuits of FIGS. 9, 10, and 12 were as follows. In the circuit of FIG. 9, the voltage had reached its operating limit. The circuit of FIG. 10 had a margin of about 0.26 volt. The circuit of FIG. 12 still had a margin of about 0.18 volt.

The above results show that the operable time for the circuits of FIGS. 10 and 12 is somewhat longer than that for the circuit of FIG. 9.

FIG. 14 shows an example of the characteristics of the battery terminal voltage.

In FIG. 14, the solid line (max) shows a voltage when no current flowed into the battery; the dotted line (min) shows a voltage when a large current flowed into the battery.

The case where the reset voltage of IC 1 is set to 1.0 volt is considered. In this case, if a reset can be triggered at a min voltage, the operable time of this circuit is 8 hours; if a reset can be triggered at a max voltage, the operable time is 16 hours. In the case of the circuit of FIG. 9, a reset can be triggered at a min voltage.

The broken line (mean) corresponds to voltages at the capacitors C2 in FIGS. 10 and 12. In this case, the operable time thereof is about 12 hours.

As described above, various types of remote commander circuits, in which one battery is used, have been proposed. However, any of these circuits are still inadequate in terms of effective use of the battery energy. In the case of FIG. 9, for example, no energy is wasted by a current-limiting resistor as shown in FIG. 8, whereas the reset voltage with respect to a battery voltage becomes relatively higher and thus the battery voltage reaches the operating limit much earlier. Therefore, also in this case, effective use of battery energy is not achieved. The circuits of FIGS. 10 and 12 can present an operable time longer than the circuit of FIG. 9. However, also in these circuits, the effective use of battery energy is not sufficiently achieved.

Therefore, it is an object of the invention to provide a source-voltage-operated circuit suitable for applications in the case where the power supply of an electric power source fluctuates, including a remote control commander operated with one battery. It is another object of the invention to substantially enable effective use of energy of the power supply in such source-voltage-operated circuit by: securing a voltage for an IC, which is used even when the battery voltage decreases, using a simple step-up circuit; and consequently prolonging an operable time of the source-voltage-operated circuit.

SUMMARY OF THE INVENTION

A source-voltage-operated circuit according to the invention includes:

an operated circuit section operated according to a voltage supplied by an electric power source;

a control-voltage-supplying circuit section for deriving a voltage higher than the voltage supplied by the electric power source from the operated circuit section to rectify the derived voltage and output the resultant voltage as an operating voltage; and a control circuit section operated according to the operating voltage for controlling the operation of the operated circuit section and stopping the operation of the operated circuit section when the operating voltage is decreased to a given reset voltage or below.

Also, the control-voltage-supplying circuit section may be provided with a limiter circuit for restricting the operating voltage of the control circuit section so as not to increase excessively above a given voltage.

Further, the electric power source may be an electric power source such that a supply voltage thereof fluctuates.

Also, the electric power source may be a battery.

In addition, the operated circuit section may be a circuit section for carrying out the operation of outputting an infrared modulating signal, and the control circuit section may be a circuit section for carrying out the control of causing the operated circuit section to output a signal in response to an operational input as the infrared modulating signal.

According to the invention, the control circuit section is supplied with a voltage boosted above the battery voltage by the control-voltage-supplying circuit section. In other words, even when the battery voltage is decreased below the reset voltage of the control circuit section, a condition such that an operating voltage higher than the reset voltage is supplied to the control circuit section can be maintained.

EMBODIMENTS

As for embodiments of the invention, circuits, which can be adopted for IR remote commanders, will be described below as the first to fourth embodiments and a circuit, which can be adopted for clocks will be described as the fifth embodiment.

Figure 1:
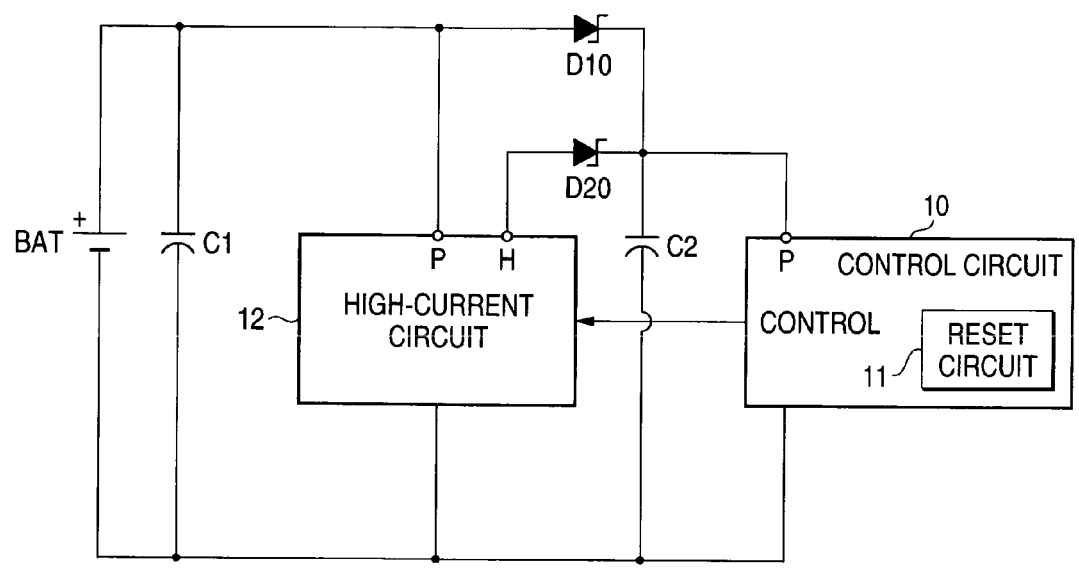
FIG. 1 is a block diagram showing a constructional concept for embodiments of the invention.

Prior to the descriptions for the first to fifth embodiments, the concept of a battery-power-operated circuit of the invention or the concept of the basic circuit configuration, which is common to the respective embodiments, will be first described in reference to FIG. 1.

<Basic Concept>

As shown in FIG. 1, a battery-power-operated circuit according to an embodiment of the invention has a high-current circuit 12 and a control circuit 10 and uses a battery (primary or secondary battery) BAT as its electric power source. The supply voltage produced by a single battery is 1.5 volts.

The high-current circuit 12 is an operated circuit section, which is operated according to a battery voltage to consume a comparatively larger amount of current. The battery voltage according to the battery BAT is stabilized by a capacitor C1 and supplied to the power source terminal P of the high-current circuit 12.

In contrast, the control circuit 10 is a circuit operable with a comparatively smaller amount of current, for example, an IC, which controls the operation of the high-current circuit 12. The control circuit 10 incorporates a reset circuit 11. The reset circuit 11 monitors the operating voltage supplied to the power source terminal P of the control circuit 10 and stops the operation of the control circuit 10 in order to avoid unwanted malfunctions when the operating voltage becomes lower than a given reset voltage. As described above, the reset voltage is an operable voltage.

Now, to the power source terminal P of the control circuit 10, there are formed a path over which a battery voltage is supplied through the diode D10 and a path over which a voltage from the terminal H of the high-current circuit 12 at a higher voltage than the battery voltage is supplied through the diode D20. Connecting the capacitor C2 as illustrated, the positive-side terminal voltage of the capacitor C2 can be used as an operating voltage supplied to the power source terminal P of the control circuit 10.

The diode D10 serves as a path for supplying a battery voltage to the control circuit 10 in a period during which the high-current circuit 12 does not work.

In an operational period of the high-current circuit 12, the combination of the diode D20 and the capacitor C2 functions as a control-voltage-supplying circuit section for deriving and rectifying a voltage higher than the battery voltage from the high-current circuit 12 to make the resultant voltage an operating voltage for the control circuit section.

In a circuit operated according to a battery voltage, a current is consumed by an internal resistance of the battery, which decreases the terminal voltage of the battery. Therefore, the larger the current is, the earlier the terminal voltage of the battery reaches its life voltage.

Then, the control circuit section is arranged to be supplied with a voltage boosted above the battery voltage in the high-current circuit 12. This makes it possible to maintain the state where the control circuit section is supplied with an operating voltage higher than the control circuit reset voltage thereby to prolong the battery life even when the terminal voltage of the battery decreases owing to the battery drain or a large amount of current (the operation of the high-current circuit 12) and then becomes lower than the reset voltage of the control circuit section.

In the case of a circuit configuration such that the minimum operating voltage of the entire circuit depends on the reset voltage of the control circuit 10, the minimum operating voltage of the battery BAT can be lowered in this way.

The reset voltage of ICs (the lower limit of operable voltages) can be controlled through IC manufacturing processes to some extent. However, it is difficult to make the reset voltage below one(1) volt because of various limitations.

To lower the reset voltage is to reduce the potential difference for controlling ON/OFF of the digital circuit element. Manufacturing digital circuit elements placing emphasis on ON property, OFF property becomes insufficient, i.e. a current therethrough cannot be cut off completely. Conversely, manufacturing digital circuit elements placing emphasis on OFF property, ON property becomes insufficient, i.e. a current cannot flow sufficiently. Then, a technique such that the operable time is prolonged by lowering the reset voltage to or below 1 volt may not be adequate. Therefore, in this invention, the operating voltage supplied to the control circuit 10 is made higher than the battery voltage with the reset voltage left at a desired value (e.g. about 1 volt), whereby it is intended to prolong the operable time.

Now, even in the case where an IC with a lower reset voltage can be manufactured, in which the above-described problem of ON and OFF properties is not produced, use of a circuit according to the invention allows the operable time to be prolonged. Thus, a circuit according to the invention is useful.

<First Embodiment>

Figure 2:
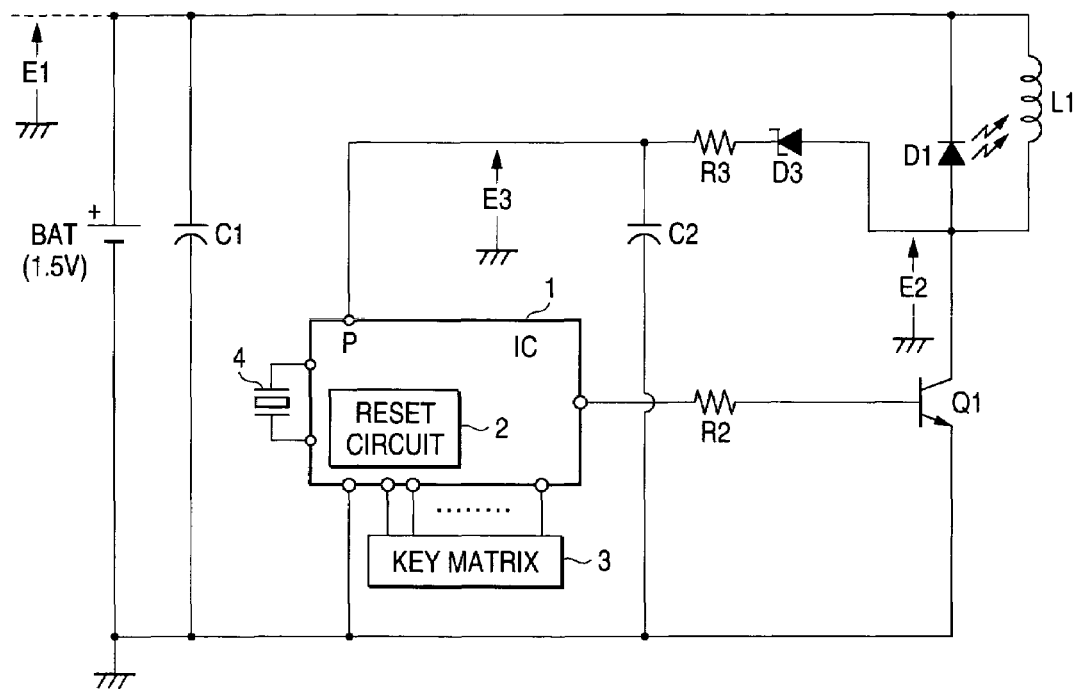
FIG. 2 is a circuit diagram for a first embodiment of the invention.

As the first embodiment of the invention, an IR remote commander circuit is shown in FIG. 2.

A battery voltage of 1.5 volts according to the battery BAT is stabilized by the capacitor C1. The battery voltage is herein indicated by E1.

The transistor Q1 is connected in series with the coil (inductor) L1. The coil L1 is connected in parallel with the IR emitting diode (LED) D1. In this case, the anode terminal of the LED D1 is connected to the collector of the transistor Q1. A circuit composed of the LED D1, coil L1, and transistor Q1 corresponds to the high-current circuit 12 described in reference to FIG. 1, to which the battery voltage E1 is applied.

In a period during which the transistor Q1 is turned ON, a current flows in the order of: the positive electrode of the battery, coil L1, transistor Q1, and negative electrode of the battery.

In a period during which the transistor Q1 is turned OFF, the current that has been flowing through the coil L1 changes into a loop current flowing from the coil L1 through the LED D1 back to the coil L1. This is a current that causes the LED D1 to emit light.

The IC 1 corresponds to the control circuit 10 in FIG. 1.

The IC 1 carries out the control of causing the LED to output an IR command signal in response to the operational input information detected by the key matrix 3.

In other words, in the remote commander, many operation keys, which allow users to operate the electronic equipment that they are to work, are prepared. The individual keys are so arranged that the operation can be detected with electrodes making up a matrix.

The IC 1 is configured as a digital circuit in which the oscillator 4 provides clocks for operation. The IC 1 generates a command signal (pulse voltage signal) in response to the operation detected by the key matrix 3 and applies the current in response to command signals (voltage pulse) to the base of the transistor Q1 through the resistor R2.

The transistor Q1 is turned on/off based on the base current according to the command signal. In a period during which the transistor Q1 is turned OFF as described above, a current flows through the IR emitting diode D1, whereby infrared rays are output therefrom. Therefore, the output infrared rays form IR command signals in response to command signals generated by the IC 1.

The IC 1 incorporates a reset circuit 2. The reset circuit 2 monitors an operating voltage supplied to the power source terminal P, and stops the operation of the IC 1 when an operating voltage at the power source terminal P is equal to or lower than the reset voltage.

In order to supply an operating voltage to the power source terminal P of the IC 1, a circuit composed of a diode (schottky-barrier diode) D3, a resistor R3, and a capacitor C2 is formed. The diode D3 has an anode connected to the anode terminal of the LED D1 and a cathode connected through the resistor R3 to the positive side of the capacitor C2. In this case, the voltage E3 of the capacitor C2 is an operating voltage to be supplied to the power source terminal P of the IC 1.

Incidentally, in the circuit of FIG. 2, the diode D3 serves both as the diodes D10 and D20 in FIG. 1.

The operation voltage E3 of the IC 1 is as follows.

In a downtime of the operation during which the IC 1 does not carry out the control of IR emission, more specifically, the transistor Q1 does not perform switching, a current flows in the order of: the positive electrode of the battery BAT, coil L1, diode D3, resistor R3, and capacitor C2. This produces the operating voltage E3 of the IC 1.

Because a current hardly flows in a downtime of the IC 1, voltage drops produced by the coil L1 and the resistor R3 can be ignored and thus a forward voltage drop (Vf) produced by the diode D3 is 0.1 volt or less. In the case where a schottky-barrier diode was used as the diode D3, Vf=0.017 volt was obtained as an actually measured value.

When the IC 1 carries out the control operation to turn the transistor Q1 ON, the collector voltage (E2) of the transistor Q1 lowers and thus the diode D3 is turned OFF.

At this time, a current flows between the collector and the emitter of the transistor Q1 from the positive electrode of the battery BAT through the coil L1.

The current according to a command signal, which turns the transistor Q1 ON, is supplied to the base of the transistor Q1 from the capacitor C2 through the IC 1.

Usually, the switching frequency of the transistor Q1 is 36 to 40 kHz, and the first time during which the transistor Q1 is in ON state is about 7 microseconds. For this approximate time, the voltage drop of the capacitor C2 causes no problem.

Next, when the transistor Q1 is turned OFF, the collector voltage (E2) of the transistor Q1 increases, whereby the LED D1 is supplied with a current.

During this time, a current flows through the LED D1 in the forward direction and the anode-side potential (E2) is higher than the cathode-side potential in voltage.

Further, during this time, the voltage E2 equals "a battery voltage E1 plus a forward dropped voltage of the LED D1," and more specifically, it increases approximately to 1.5+1.5=3 volts.

The voltage E2 charges the capacitor C2 through the diode D3 and the resistor R3. In the case where the forward dropped voltage (Vf) of the diode D3 during this time is 0.2 volt, the capacitor C2 is to be charged up to 2.8 volts.

In other words, the capacitor C2 can be charged to a voltage higher than the battery voltage E1, and therefore the operating voltage E3 enough to operate the IC 1 can be secured even when the battery voltage E1 decreases.

The resistor R3 serves to prevent all of the energy stored by the coil L1 from flowing toward the capacitor C2 through the diode D3, and to secure the current flowing through the LED D1.

In the circuit of FIG. 2, when the IC 1 has a starting voltage, a subsequent voltage drop at the battery terminal has no direct effect on a decrease in operating voltage (E3) of the IC 1.

In the case of continuous operation, the battery voltage E1 causes a current to flow through the coil L1 and the transistor Q1. A part of the energy stored by the coil L1 goes through the diode D3 to be stored by the capacitor C2. When this stored power can operate the IC 1, the operation is continued.

Our actually operated circuit had been working until the battery voltage E1 decreased to or below 0.2 volt.

Figure 3A:
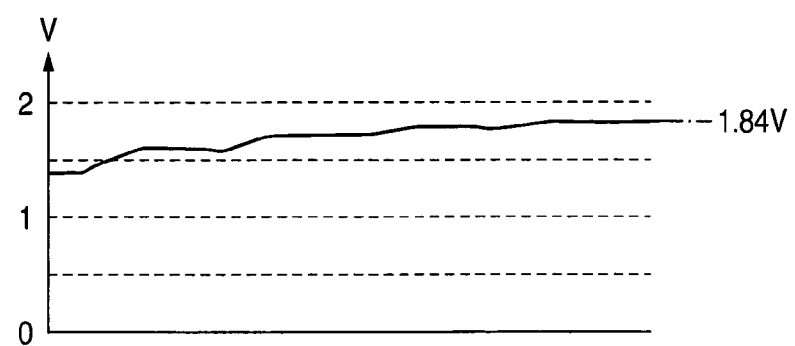
FIGS. 3A and 3B are graphs showing the results of observations on the relation between the capacitor voltage and battery voltage in a circuit according to the first embodiment.
Figure 3B:
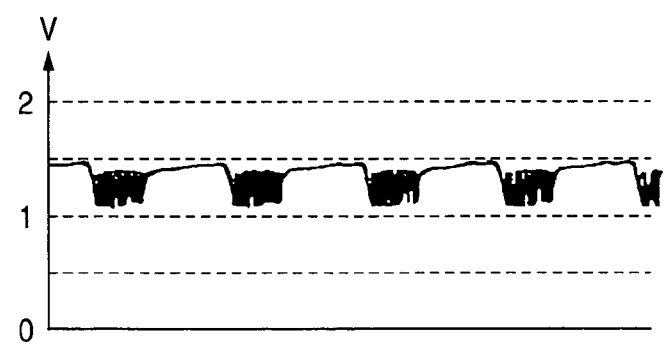

FIGS. 3A and 3B show the results of observations on the voltage conditions in the circuit of FIG. 2. More specifically, FIG. 3A presents a voltage obtained at the capacitor C2, i.e. an operating voltage E3 at the power source terminal P of the IC 1. FIG. 3B presents a terminal voltage E1 of the battery BAT.

Figure 11A:
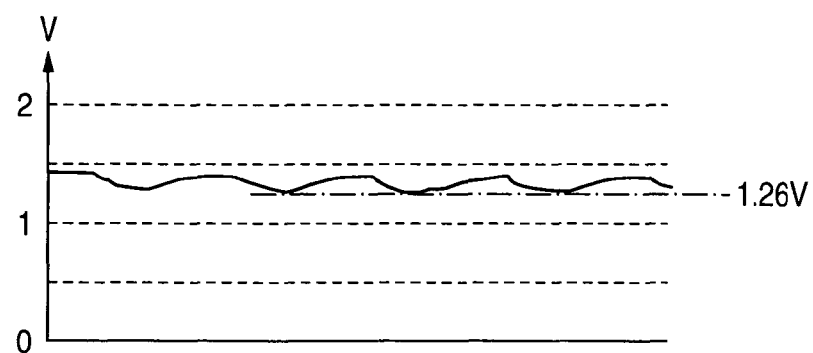
FIGS. 11A and 11B are graphs showing the results of observations on the relation between the capacitor voltage and battery voltage in the circuit of FIG. 10.
Figure 11B:
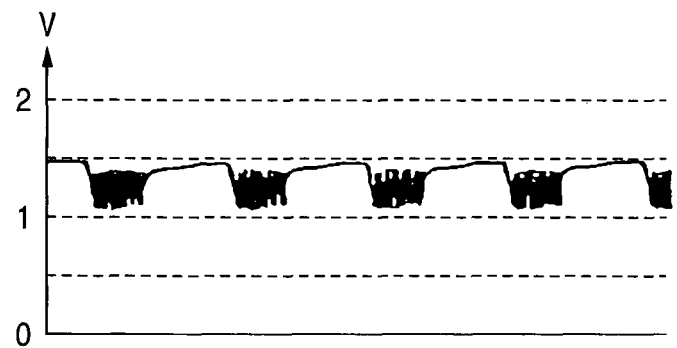
Figure 12:
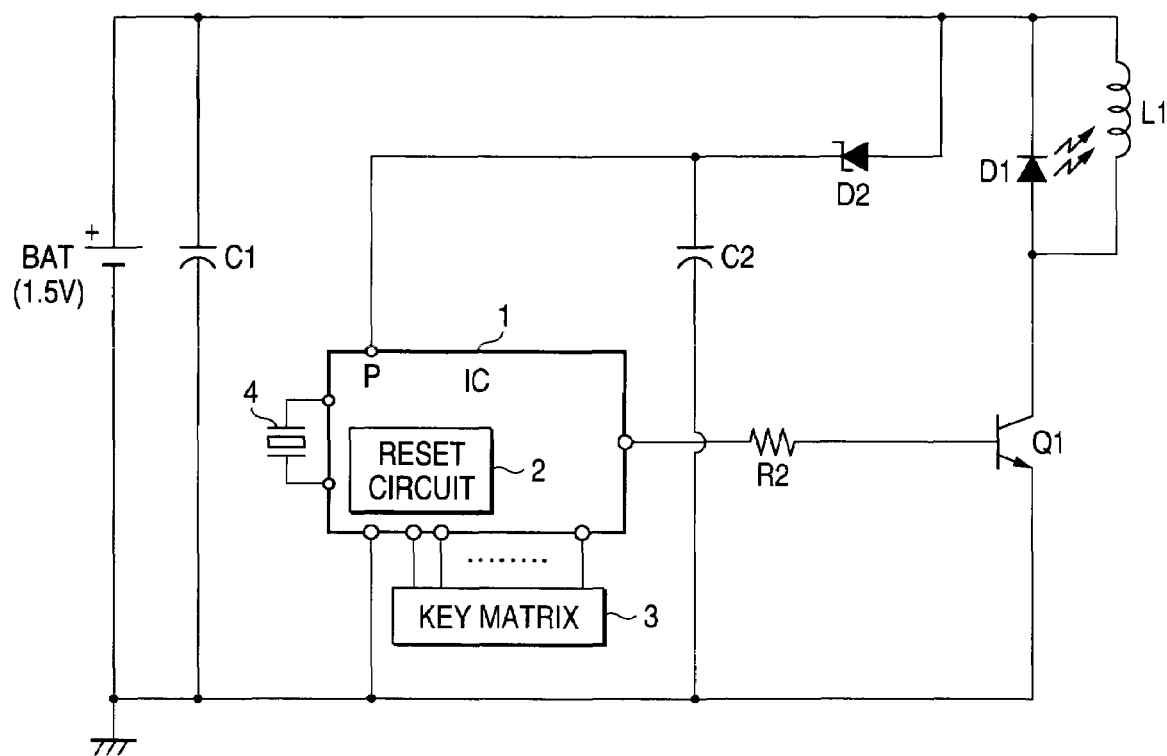
FIG. 12 is a circuit diagram for the compensation of a momentary voltage drop in the circuit with one battery used therein.
Figure 13A:
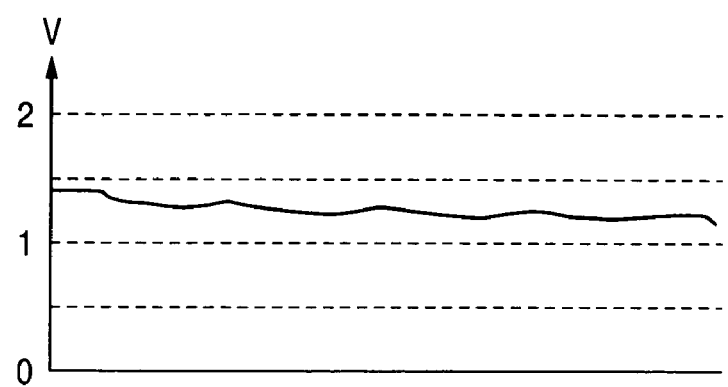
FIGS. 13A and 13B are graphs showing the results of observations on the relation between the capacitor voltage and battery voltage in the circuit of FIG. 12.
Figure 13B:
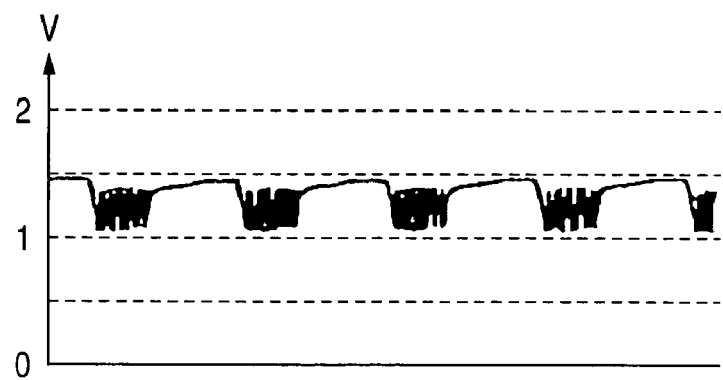
Figure 14:
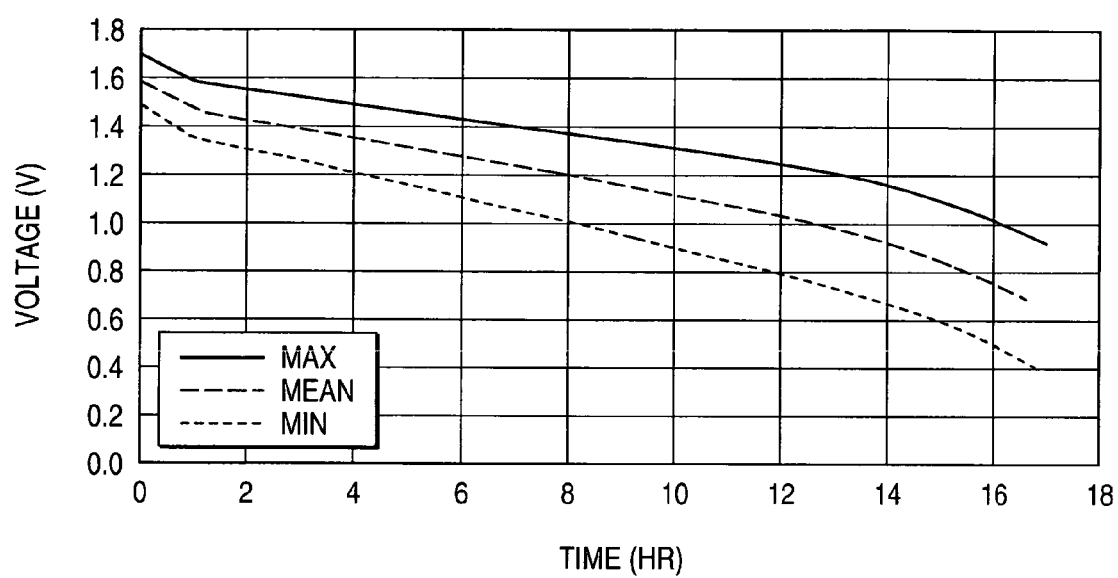
FIG. 14 is a graph showing the terminal voltage characteristics of the battery.

Incidentally, a used battery, which had been drained to some extent, was used as the battery BAT in the observations, as in the above-described cases of FIGS. 11 and 13.

The current flowing through the LED D1 was as large as 200 to 400 mA, so that the internal resistance of the battery BAT caused a voltage drop in the terminal voltage E1 of the battery. Thus, as shown in FIG. 3B, the minimum voltage at the battery terminal in operating conditions lowered as low as about 1.0 volt in spite of the battery having a terminal voltage E1 of about 1.4 volts in no-load conditions.

In contrast, the operating voltage E3 increased in a period during which the transistor Q1 performed switching, as shown in FIG. 3A. This is because the capacitor C2 was charged in a period of the switching as described above. For example, five frames later than a command signal, the operating voltage E3 increased above 1.8 volts.

In other words, in the case where the reset voltage is 1 volt and the IC is operated with a used battery having a battery terminal voltage E1 of 1.43 volts in no-load conditions, an operating voltage E3 at the power source terminal P of the IC 1 is about 1.40 volts initially (before starting the operation). While this value is slightly less than the terminal voltage E1 of the battery, there is a margin of about 0.40 volt at this point. Since the time of starting the operation, the voltage E3 has been increasing. For example, five frames later, the operating voltage E3 becomes 1.84 volts and thus a margin of 0.84 volt to the reset voltage is produced.

It is also understood from this that the circuit of the example can prolong the operable time.

Further, as the battery is drained to decrease the battery voltage E1, the output of IR transmission decreases gradually, which is pertinent to a range that IR command signals can travel and as such the circuit can still operate as a remote commander.

It may seem to users that the drain of batteries makes the range within which the electronic equipment can be operated with a remote commander shorter. However, the operation itself is still possible. In addition, users can recognize when the battery needs replacing by sensing so. Users can use a remote commander in which a range that IR command signals can travel has been shortened, until a new one is prepared.

Incidentally, such one-battery-operated circuit has a low supply voltage originally, and therefore it is appropriate to use a schottky-barrier diode, whose forward dropped voltage Vf is small, as the diode D3 as the above-described example. The schottky-barrier diode has a forward dropped voltage of 0.1 volt or less in a low-current region. In contrast, for example, a silicon diode has a forward dropped voltage Vf of about 0.5 volt. Therefore, a voltage before starting the operation becomes smaller than the battery voltage E1 by this amount, and the lower limit of operable voltages with respect to the battery voltage increases by that amount to make the operable time shorter.

<Second Embodiment>

Figure 4:
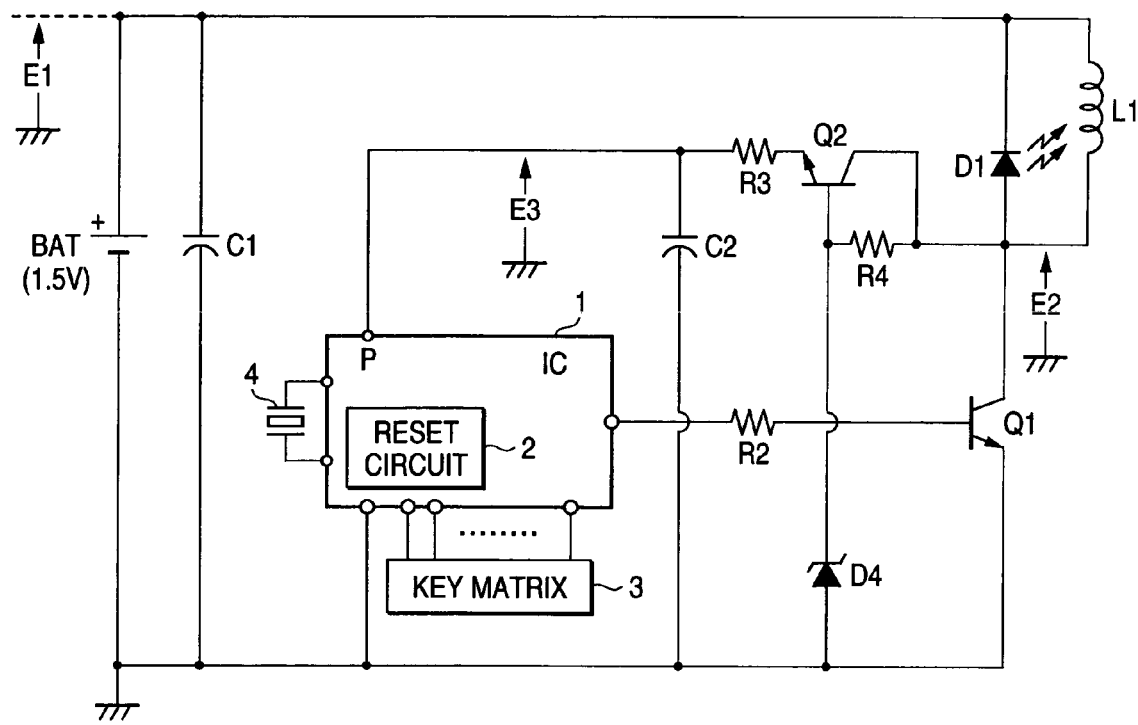
FIG. 4 is a circuit diagram for a second embodiment of the invention.

FIG. 4 shows the second embodiment of the invention, which is an example of a circuit arranged to prevent an operating voltage E3 to be supplied to the IC 1 from rising excessively.

In this case, a transistor Q2, a resistor R4, and a Zener diode D4 are connected instead of the diode D3 in FIG. 2. More specifically, the transistor Q2 has a collector connected to the anode side of the LED D1 and an emitter connected through the resistor R3 to the positive side of the capacitor C2.

Between the base of the transistor Q2 and the negative electrode of the battery BAT is connected the Zener diode D4. The resistor R4 is connected between the collector and base of the transistor Q2.

Like the circuit of FIG. 2, in a period during which the transistor Q1 performs switching, the collector voltage (E2) of the transistor Q1 rises to "a battery voltage E1+a forward dropped voltage (Vf) of the LED D1," and if the Zener diode D4 does not exist, the terminal voltage of the capacitor C2 increases up to about 3 volts.

When the withstand voltage of the IC 1 is lower than that voltage, some voltage limit is required.

Therefore, the circuit of FIG. 4 is so arranged that the collector voltage (E2) of the transistor Q1 is coupled to the cathode side of the Zener diode D4 through the resistor R4, and the base voltage of the transistor Q2 is fixed to the voltage of the Zener diode.

In addition, the emitter voltage of the transistor Q2 becomes a voltage lower than the base voltage by a voltage between the base and emitter Vbe.

Thus, the Zener diode D4 makes the base voltage of the transistor Q2 constant to prevent the IC 1 from being applied with an operating voltage E3 exceeding the withstand voltage of the IC even when the transistor Q1 has a collector voltage (E2) of 3 volts.

Now, it is important to avoid flowing a needless current in a circuit dead time because this circuit is operated with a battery. In order to do so, it is preferable to select as the diode D4 a Zener diode such that it does not allow a current to flow therethrough with a voltage supplied by one battery (1.5 volts).

<Third Embodiment>

Figure 5:
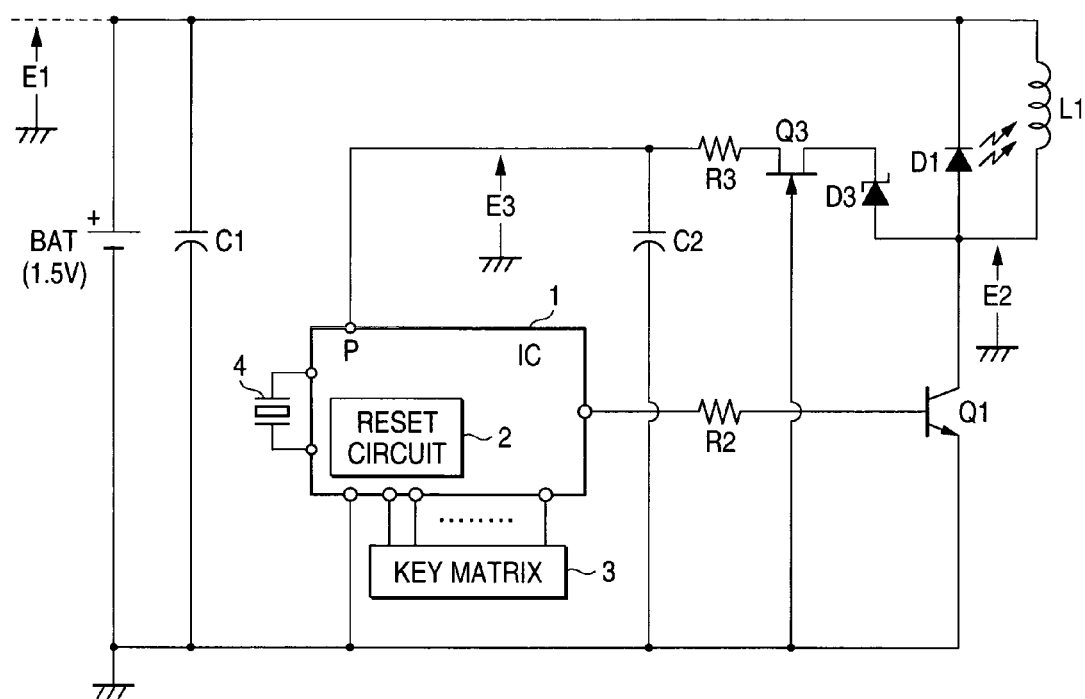
FIG. 5 is a circuit diagram for a third embodiment of the invention.

FIG. 5 shows the third embodiment of the invention, which is also an example of a circuit arranged to prevent an operating voltage E3 to be supplied to the IC 1 from rising excessively.

In this case, a schottky-barrier diode D3 and a resistor R3 are placed as in the case of the circuit of FIG. 2, while a junction FET Q3 is connected between the schottky-barrier diode D3 and the resistor R3 as shown in FIG. 5. More specifically, the junction FET Q3 has a drain connected to the cathode of the schottky-barrier diode D3 and a source connected to the resistor R3.

In the junction FET Q3, when the source voltage exceeds the pinch-off voltage, the electrical continuity between the source and drain of the FET is turned OFF state, whereby a current cannot flow therebetween any more and the operating voltage E3 of the IC 1 can be restricted in voltage.

This makes it possible to prevent the power source terminal P of the IC 1 from being applied with a excess voltage above the withstand voltage thereof even when the collector voltage (E2) of the transistor Q1 keeps rising.

<Fourth Embodiment>

Figure 6:
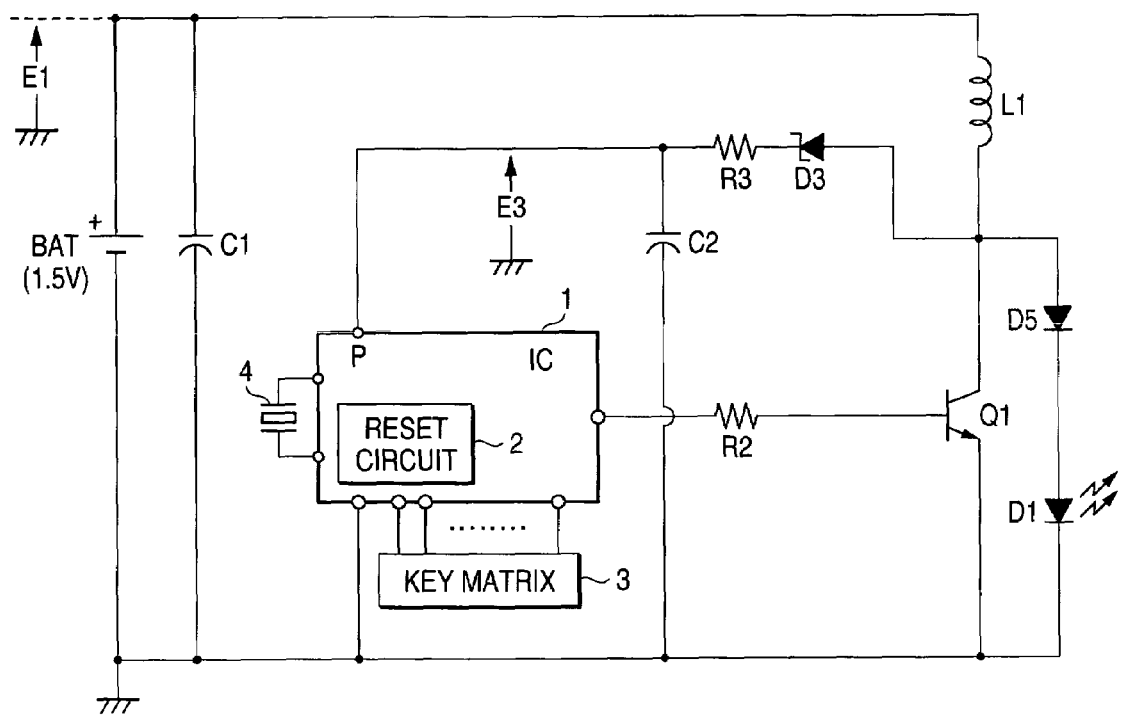
FIG. 6 is a circuit diagram for a fourth embodiment of the invention.

FIG. 6 shows a circuit according to the fourth embodiment of the invention, which is also an example of a circuit arranged to prevent an excess voltage as an operating voltage E3 to be supplied to the IC 1 from being applied to the IC.

In this circuit, the coil L1 and the transistor Q1 are connected in series, and the diode D5 and the LED D1, which are connected in series, are further connected in parallel with the electrical connection between the collector and emitter of the transistor Q1.

The circuit in this embodiment is the same as the circuit of FIG. 2 in that the operating voltage E3 for the IC 1 is derived from the collector voltage of the transistor Q1 through the schottky-barrier diode D3, the resistor R3, and the capacitor C2.

In this case, the energy held by the coil L1 flows through the diode D5, the LED D1, the battery BAT, and the coli L1 in this order to be radiated when the transistor Q1 is turned OFF. The collector voltage (E2) of the transistor Q1 during this time equals the sum of forward dropped voltages (Vf) of the diode D5 and the LED D1. In the case where the diode D5 is a silicon diode, the collector voltage (E2) is about 2.2 volts.

The voltage resulting from the subtraction, the above collector voltage minus a forward dropped voltage of the schottky-barrier diode D3 (Vf=0.2 volt), i.e. 2.0 volts here, is stored by the capacitor C2.

The peak voltage at the collector of the transistor Q1 is substantially fixed regardless of the battery voltage E1, so that the voltage at the capacitor C2, i.e. the operating voltage E3 of the IC 1, is also constant approximately. Therefore, it is possible to prevent the power source terminal P of the IC 1 from being applied with an excessively large voltage exceeding the withstand voltage of the IC.

Now, it is important to avoid flowing a needless current in a circuit dead time because this circuit is operated with a battery. In the case of the circuit of FIG. 6, a needless current cannot flow because two diodes D5 and D1 are connected in series to add up forward dropped voltages Vf of the two diodes thereby to make the collector voltage of the transistor Q1 higher than the battery voltage.

<Fifth Embodiment>

While examples of remote commander circuits have been described in the above embodiments, the invention is also useful for a circuit including a circuit section operated with a comparatively small amount of current and a circuit section that consumes a large amount of current, wherein the minimum operating voltage of the entire circuit depends on the circuit section operated with a comparatively small amount of current.

Figure 7:
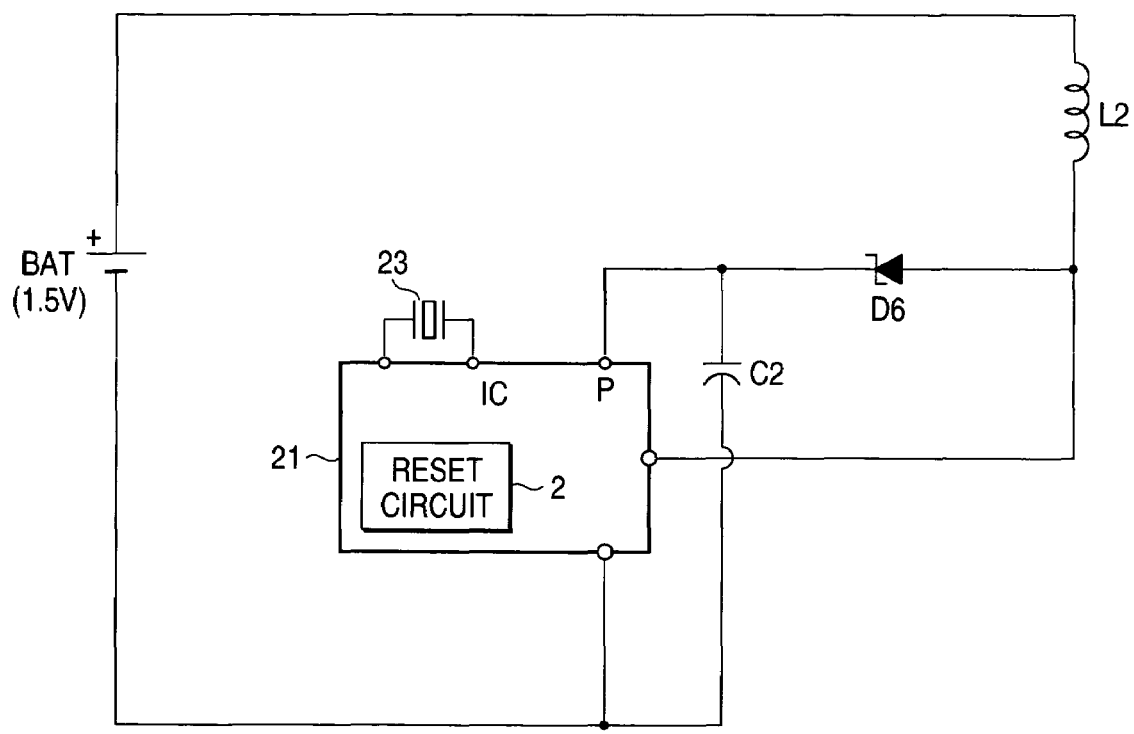
FIG. 7 is a circuit diagram for a fifth embodiment of the invention.
Figure 8:
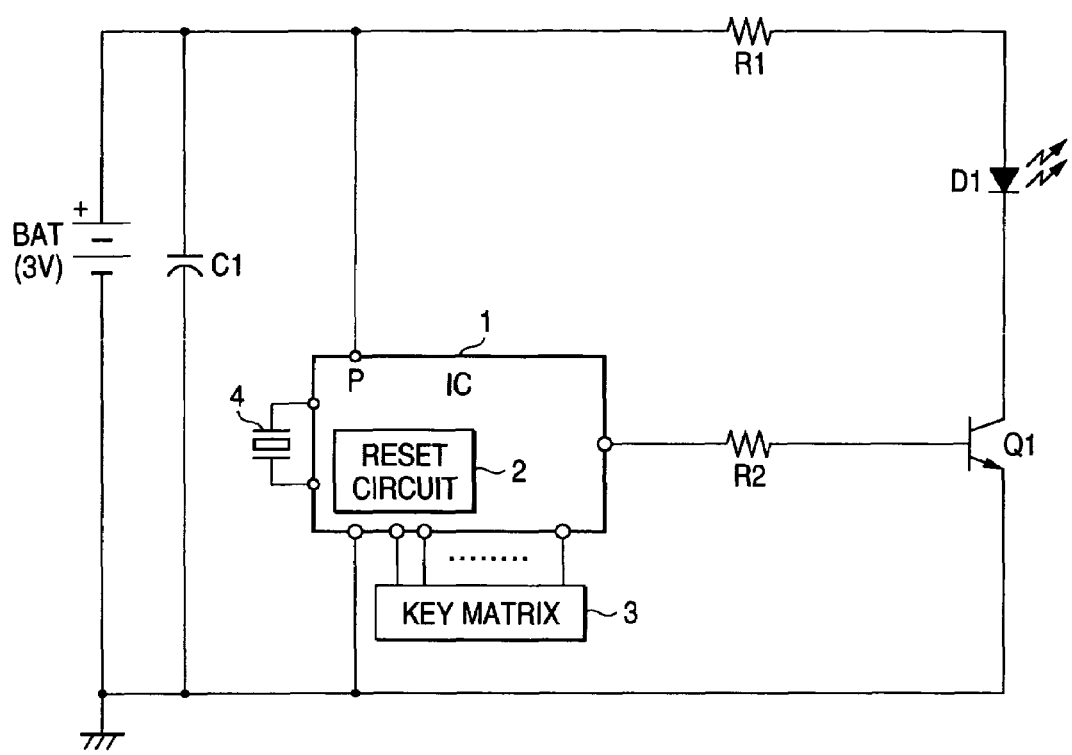
FIG. 8 is a circuit diagram for a conventional circuit using two batteries.
Figure 9:
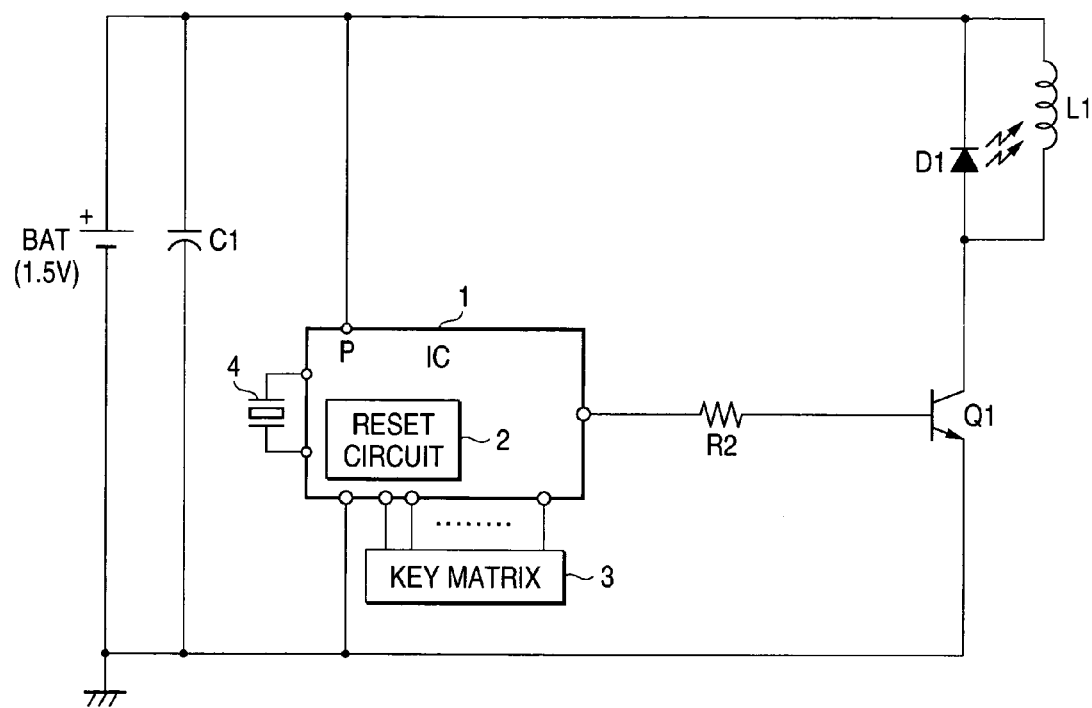
FIG. 9 is a circuit diagram for a conventional circuit using one battery.
Figure 10:
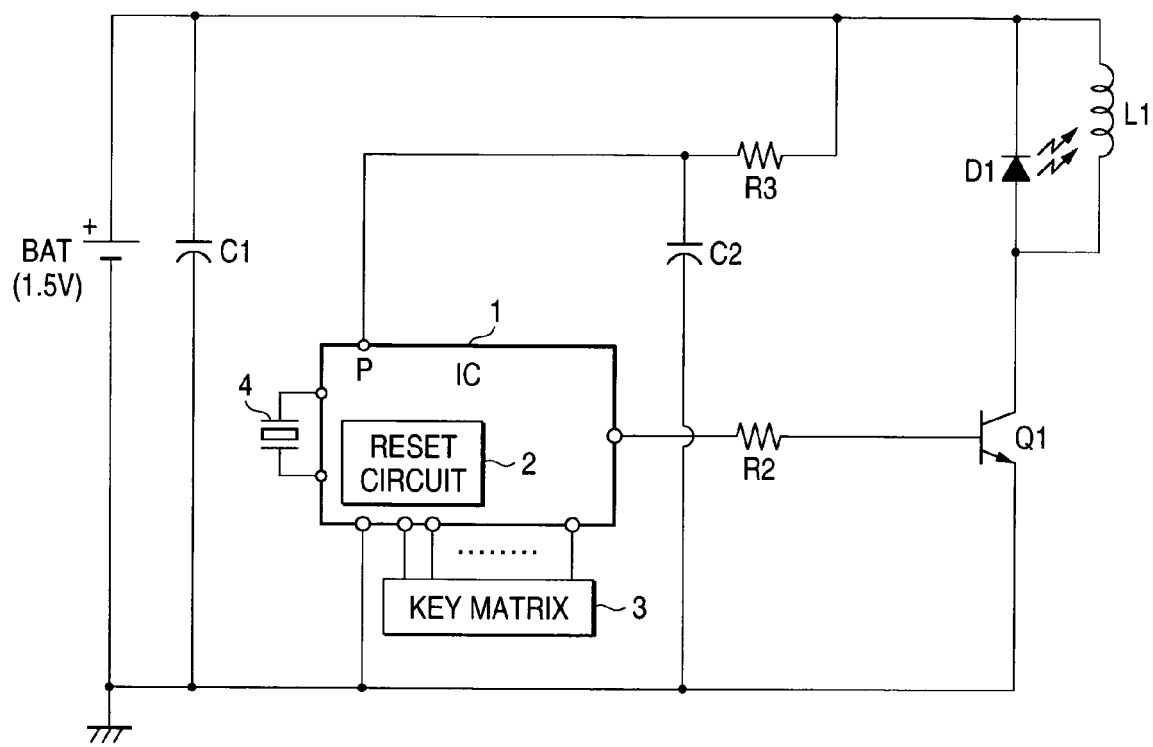
FIG. 10 is a circuit diagram for the compensation of a momentary voltage drop in the circuit with one battery used therein.

As an example of such circuit, for example, there is a clock circuit as shown in FIG. 7 other than remote commanders.

In FIG. 7, the coil L2 is a coil of a motor used for a second hand. The IC 21 is a control circuit including oscillator and divider circuits and a reset circuit 22. The IC is operated based on clocks provided by a crystal oscillator 23.

The IC 21 consumes an extremely small amount of current, whereas the motor, which actuates the second hand, consumes a larger amount of current.

In other words, the coil L2 corresponds to the high-current circuit 12 of FIG. 1, and the IC 21 corresponds to the control circuit 10.

The power source terminal P of the IC 21 is supplied with the voltage of the capacitor C2 as an operating voltage, which is derived by rectifying a higher voltage from the coil L2 for the motor in the schottky-barrier diode D6.

In the case of a clock, switching is performed once per second in order to actuate its second hand, whereby the voltage of the capacitor C2 can be kept higher than the terminal voltage of the battery at all times.

Consequently, even when the terminal voltage of the battery becomes lower than the reset voltage, the circuit of FIG. 7 is operable and battery energy can be used effectively.

While the embodiments of the invention have been described above, various other circuits can be considered as examples of circuits according to the invention. Also, the invention can be applied as a circuit other than remote commanders and clocks in various ways.

Further, while the cases where a battery (primary or secondary battery) is selected as an electric power source have been described in the above embodiments, the invention is not limited to the configurations of those embodiments. The invention can provide the same advantages for other batteries including a solar battery, the power supply of which fluctuates.

As shown from the above descriptions, in the invention, the control circuit section is supplied with a voltage boosted above the battery voltage by the control-voltage-supplying circuit section according to the operation of the operated circuit section. Thus, even when battery drain or a voltage drop owing to a current flowing through the battery decreases the battery voltage below the reset voltage of the control circuit section, a condition such that an operating voltage higher than the reset voltage is supplied to the control circuit section can be maintained. Consequently, the control circuit section is not reset until the battery voltage is drained to reach a considerably low voltage, whereby the operable time can be prolonged remarkably to use the battery energy effectively.

For example, embodying the invention as a circuit of a remote commander with one battery used therein enables us to use the remote commander for a longer time.

Further, the control-voltage-supplying circuit section is provided with a limiter circuit for restricting the operating voltage of the control circuit section so as not to increase excessively, whereby a voltage supply such that the withstand voltage of the control circuit section is exceed is prevented.

What is claimed is:

1. A source-voltage-operated circuit comprising:
an operated circuit section operated according to a voltage supplied by a battery, said operated circuit section having:
a series circuit of a coil and a first switching device, and
a light-emitting diode connected parallel to said coil,
wherein when said first switching device is turned on, a current flows from said battery through said coil and said first switching device, and when said first switching device is turned off, a loop current flows through said coil and said light-emitting diode;
a control-voltage-supplying circuit section having a second switching device and a capacitor, said second switching device connected to a connection point of said coil and said first switching device for controlling a direction of a current from said coil to said capacitor, and said capacitor storing a portion of energy from said switching operation of said first switching device and outputting the resultant voltage as an operating voltage, the resultant voltage being higher than the voltage supplied by said battery; and
a control circuit section operated according to the operating voltage for controlling the operation of said operated circuit section and stopping the operation of said operated circuit section when the operating voltage is decreased below a given reset voltage.

2. The source-voltage-operated circuit of claim 1, wherein said control-voltage-supplying circuit section is provided with a limiter circuit that restricts the operating voltage of said control circuit section so as not to substantially increase above a given voltage.

3. The source-voltage-operated circuit of claim 1, wherein said given reset voltage is set to a voltage less than a drained voltage of said battery.

4. The source-voltage-operated circuit of claim 1, wherein said light-emitting diode outputs infrared rays, and said control circuit section controls said first switching device in response to an operational input.

5. A remote commander comprising:
an operated circuit section operated according to a voltage supplied by a battery, said operated circuit section having;
a series circuit of a coil and a first switching device, and
a light-emitting diode connected parallel to said coil,
wherein when said first switching device is turned on, a current flows from said battery through said coil and said first switching device, and when said first switching device is turned off, a loop current flows through said coil and said light-emitting diode;
a control-voltage-supplying circuit section having a second switching device and a capacitor, said second switching device connected to a connection point of said coil and said first switching device for controlling a direction of a current only from said coil to said capacitor, and said capacitor storing a portion of energy caused by said switching operation of said first switching device and outputting the resultant voltage as an operating voltage, the resultant voltage being higher than the voltage supplied by said battery; and
a control circuit section operated according to the operating voltage for controlling the operation of said operated circuit section and stopping the operation of said operated circuit section when the operating voltage is decreased below a given reset voltage.

* * * * *